United States Patent [19]

Volk

[11] 3,895,415
[45] July 22, 1975

[54] RETAINER FOR DRESSED POULTRY

[76] Inventor: Anthony J. Volk, 173 E. Syracuse St., Turlock, Calif. 95380

[22] Filed: June 4, 1974

[21] Appl. No.: 476,297

[52] U.S. Cl. .................... 17/11; 17/1 S; 17/44.1
[51] Int. Cl. ............................................. A22c 21/00
[58] Field of Search ............. 17/11, 1 S, 1 R, 44.1, 17/44, 44.2, 44.3

[56] References Cited
UNITED STATES PATENTS

| 569,142 | 10/1896 | Travers | 17/44.3 |
|---|---|---|---|
| 1,091,085 | 3/1914 | Roucher | 17/1 S UX |
| 1,633,499 | 6/1927 | Selden | 17/11 |
| 2,189,421 | 2/1940 | Huschka | 17/11 |
| 2,583,913 | 1/1952 | Weiterschan | 17/11 X |
| 2,722,712 | 11/1955 | Rabe | 17/11 |
| 2,830,319 | 4/1958 | Muntz | 17/44.1 UX |
| 3,112,515 | 12/1963 | Volk | 17/11 |
| 3,201,824 | 8/1965 | Konopa | 17/11 |

Primary Examiner—Anton O. Oechsle
Assistant Examiner—Arnold W. Kramer
Attorney, Agent, or Firm—Gregg, Hendricson & Caplan

[57] ABSTRACT

A limitedly flexible retainer formed as an integral plastic unit with an upper bar connected at each end by resiliently extensible members to a lower retaining bar having depending hooks at each end thereof for engagement with the carcass of dressed poultry. Central spring-like locking elements for extending along the creases of the hocks connect the upper bar and retainer bar to thus retain together the legs of a poultry carcass and at the same time to retain the poultry tail in closing relation to the rear poultry carcass opening.

12 Claims, 10 Drawing Figures

PATENTED JUL 22 1975    SHEET 2    3,895,415

RETAINER FOR DRESSED POULTRY

BACKGROUND OF THE INVENTION

In the preparation of poultry such as turkeys for the market it is conventional to kill, clean and truss the bird so that it is ready for stuffing and cooking. Particularly with regard to turkeys it is known that various types of trussing devices have been developed including flexible lines and wire yokes. A highly successful device of this type is disclosed in U.S. Pat. No. 3,112,515.

It is conventional to truss poultry such as turkeys during processing thereof so that the bird is trussed during subsequent shipping, sale and use. There are two major aspects to the trussing of poultry; one being related to the initial processing of the poultry, and the second being related to the ultimate cooking and use of the poultry.

Considering first the processing, it is highly advantageous to be able to truss the legs of the poultry to the body and also to retain the tail of the poultry by the trussing. This can be accomplished in a variety of ways. The trussing device must, of course, be impervious to all materials that it may come in contact with during processing and must not be affected by cooking or freezing temperatures. It is also desirable in processing to be able to employ a single trussing device for various sized birds and prior art devices are somewhat limited in this respect. It would also be desirable to be able to employ trussing devices to tag individual birds being processed in order to identify separate batches or origins of different batches of birds passing through a single processing plant. Wire yokes or the like do not readily lend themselves to this type of tagging and, furthermore, at least certain types of wire itself may be less than ideal from certain standpoints of sanitation.

With regard to the stuffing and cooking of poultry, it is necessary for trussing devices to readily disengage the fowl so that the cook can inspect the interior of the carcass and place stuffing therein. Also, the trussing should be readily reapplied after stuffing and should securely hold the tail of the fowl in closing relation to the carcass opening to retain the stuffing therein. After cooking the trussing device should be readily removable from the fowl for access to the stuffing and carving of the bird.

SUMMARY OF INVENTION

The present invention provides a simple unitary poultry retainer formed of a plastic material such as nylon or the like, having a limited flexibility and being impervious to any and all chemical substances employed in the processing or use of poultry.

The retainer of this invention is physically formed as an upper transverse bar preferably having a ring or the like flexibly extending therefrom with a lower spaced retaining bar connected to the upper bar by resiliently extensible side members. A pair of hooks with elongated shanks depends from each end of the retainer bar for engaging openings in the back structure of poultry. A pair of resiliently extensible lock members extend between the upper bar and retainer bar for location within the knuckle pieces of poultry hocks.

The retainer of the present invention may be formed by injection molding, for example, and is produced in a relatively planar configuration with means provided at each end of the retainer bar for detachably locking together a plurality of retainers, as for shipment or the like. These means include a cylindrical boss on one side of a retainer bar end with a mating cylindrical depression on the other side of such end and the reverse at the opposite end of the bar.

In use, the retainer of the present invention is disposed with the upper bar across and slightly behind the knuckles or hocks of poultry with the leg ends pressed together and the retainer bar clamped tightly beneath the hock ends by the resilient side elements which extend about the opposite lateral side of the two hocks pressed together. The locking elements extend across the inner sides of the hocks. The hooks extend into the rear opening of the poultry for extension through kidney holes or the like in the back structure of the poultry so as to anchor the retainer in place.

The material of which the retainer of the present invention is formed is limitedly flexible and is substantially impervious to chemicals and heat. Additionally this material may be readily colored so that different batches of retainers may be formed of a different color for coding batches of poultry processed in a processing plant, for example.

DESCRIPTION OF FIGURES

The present invention is illustrated as to preferred embodiments thereof in the accompanying drawings wherein:

FIG. 7 is a perspective illustration of a plurality of retainers in accordance with the present invention stacked together as for shipping or the like;

DESCRIPTION OF PREFERRED EMBODIMENTS

Figure 1:
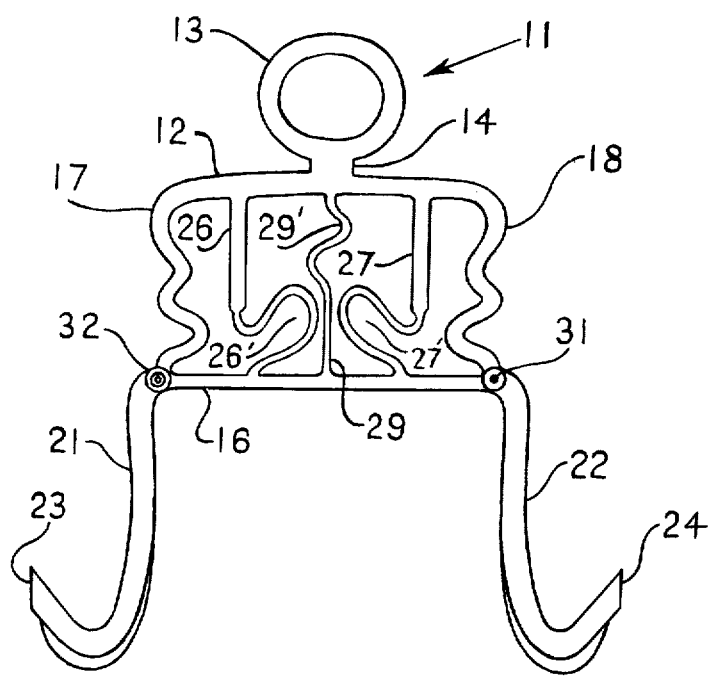
FIG. 1 is a plan view of a retainer in accordance with the present invention.
Figure 2:
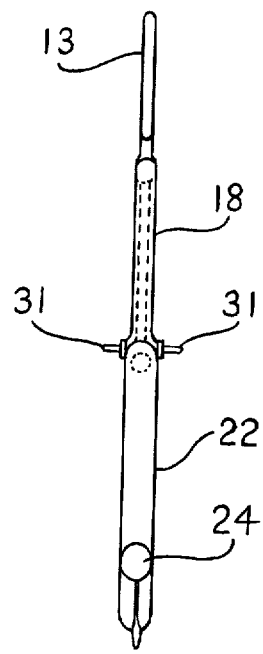
FIG. 2 is a side elevational view of the retainer of FIG. 1.

Referring first to the embodiment of the present invention illustrated in FIGS. 1 and 2 of the drawings, it will be seen that the physical structure of the retainer of this invention is relatively simple. The retainer is formed as a single integral unit preferably by molding such as injection molding from a plastic material such as nylon. The material of the present invention has a limited flexibility which is, in part, dependent upon the thickness of the material and is furthermore impervious to all chemical substances that the retainer may possibly contact in the processing or use of poultry. Thus, for example, the material of the retainer is impervious to water, salt-water, butter, turkey fat, turkey flesh, hot grease, and is also substantially unaffected by temperature at least within the range of temperatures in which poultry may be processed, stored or cooked. It is additionally noted that the material of the retainer hereof is readily adapted to be colored as by the application of dye prior to molding or other manner of formation.

The retainer 11 of FIGS. 1 and 2 includes an upper transverse piece or bar 12 having a flat ring 13 connected to the center of the top thereof by a short integral flexible tab 14. Beneath the top bar 12 there is disposed a retainer bar 16 joined to the ends of the top bar by convoluted side pieces 17 and 18. These side pieces 17 and 18 are formed with curved portions so as to be resiliently extensible, for reasons discussed below. Depending from the ends of the retainer bar 16 are a pair of shanks 21 and 22 terminating in outwardly extending up-turned hooks 23 and 24, respectively.

The structure briefly described above is adapted to fit over the ankle knuckles or hocks of poultry with the side pieces 17 and 18 disposed on opposite sides of these hocks and the bars 12 and 16 disposed above and below the hocks. There is also provided, as a part of the present invention, a pair of locking elements 26 and 27 extending downwardly from the under side of the upper bar 12 and having looped lower ends 26' and 27', respectively, terminating in the retainer bar 16. These locking members 26 and 27 are adapted to be extended across the knuckle creases or hock depressions of poultry legs disposed within the confines of the bars and side members as described above. The looped lower ends of these locking members provide for extending the length thereof by resiliently deforming the loops. There is additionally provided as a portion of the retainer a central connector 29 extending centrally between the upper bar 12 and retainer bar 16 with a portion of this connector having at least limited convolutions or curved portions 29' so that the retainer may also be resiliently extended in length.

It is to be appreciated that the limited flexibility of the material of the present retainer affords the capability of curved or convoluted parts thereof being resiliently extended, i.e., lengthened, and the amount of force required for such extension may be readily established by the thickness of the individual element. It is also noted that the central connector 29 is provided primarily to prevent undue sagging of the retainer bar 16 or separation of the centers of the bar 12 and 16 for maximizing the difference in size of poultry that may be accommodated by a single retainer. Under the circumstances wherein the retainer hereof is intended only for use with poultry of very limited difference in size, the convolutions or loops in the side members and in the locking means may be either minimized or eliminated. Also the central connector 29 may sometimes be eliminated.

Retainers formed in accordance with the present invention are also preferably provided with means for locking successive retainers together in a stack thereof. Such means are shown in FIGS. 1 and 2 as including a small cylindrical boss 31 extending laterally outward from one end of the retaining bar 16, for example, on a first side thereof and a small cylindrical indentation 32 extending inwardly of the opposite end of the retainer bar 16 at such side. On the opposite side of the retainer bar 16 there is provided a small cylindrical indentation aligned with the boss 31 and a small cylindrical boss aligned with the indentation 32. The boss and indentation of one retainer are adapted to mate with the indentation and boss of another retainer placed in facing relation to the first, the two retainers being pressed together. The size of the indentations is substantially the same as the size of the bosses so that the retainers in fact snap together and will not fall apart but may be pulled apart. It will be appreciated that this capability of locking together a stack of retainers such as illustrated in FIG. 7 is highly advantageous for shipping and handling of the retainers.

Figure 7:
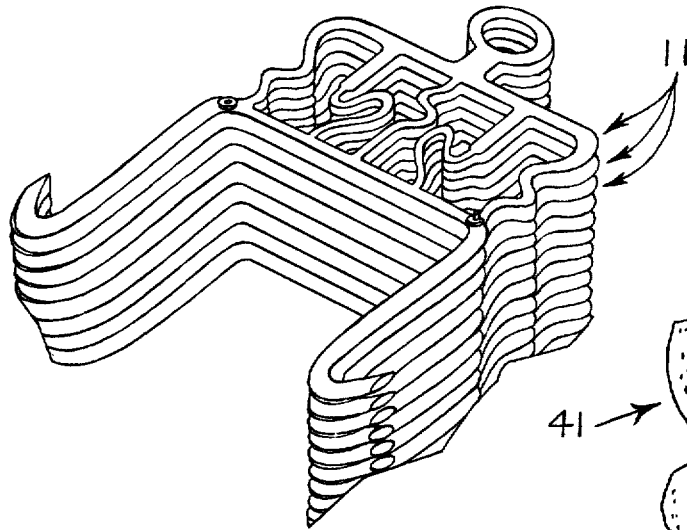

A stacked arrangement of retainers is illustrated in FIG. 7. Substantially any desired number of retainers may be placed in facing relationship and snapped together with bosses and depressions mating so that a batch or group of retainers is readily handled, stored, shipped or the like, without the necessity of additional binding means. The retainers may, however, be readily separated merely by snapping each retainer from the stack thereof for use.

Figure 3:
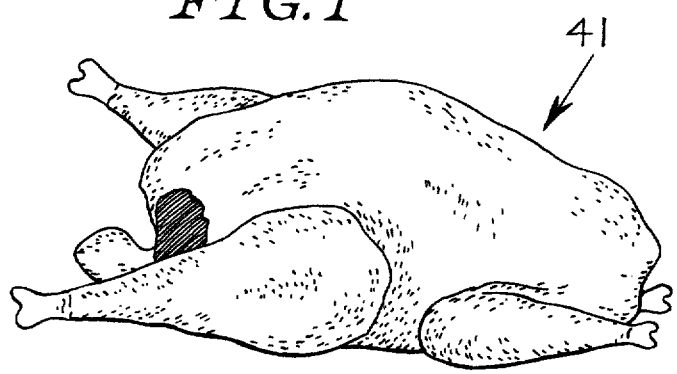
FIG. 3 is a perspective view of an eviscerated fowl such as a turkey ready for trussing.
Figure 4:
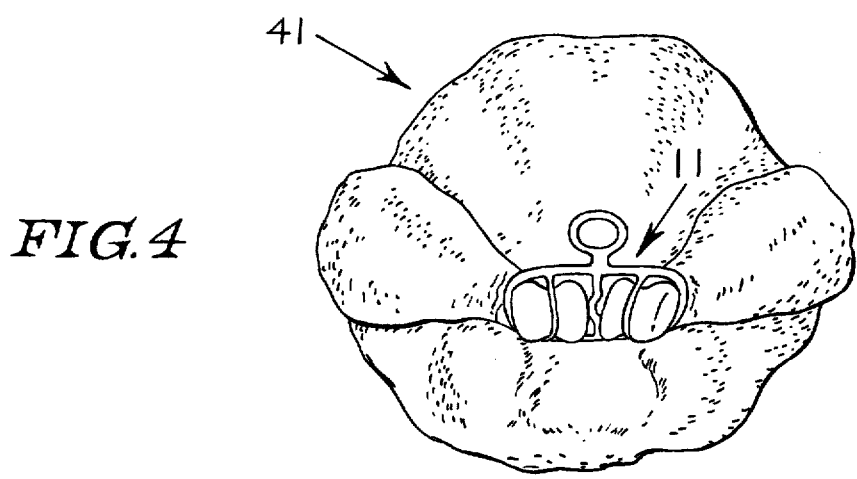
FIG. 4 is a rear end elevation of a fowl such as a turkey trussed with the retainer of the present invention.

The retainer of the present invention is adapted for utilization in the trussing of poultry such as, for example, a turkey. In FIG. 3 there is illustrated an eviscerated turkey 41. In the trussing of such a fowl, it is necessary to tie or otherwise secure the legs of the fowl against the body and also to close the rear body aperture to retain turkey parts such as the neck, heart, gizzard and the like within the body opening. The present invention is particularly adapted for such trussing to lock together the legs and close the body opening, as illustrated in FIG. 4.

Figure 5:
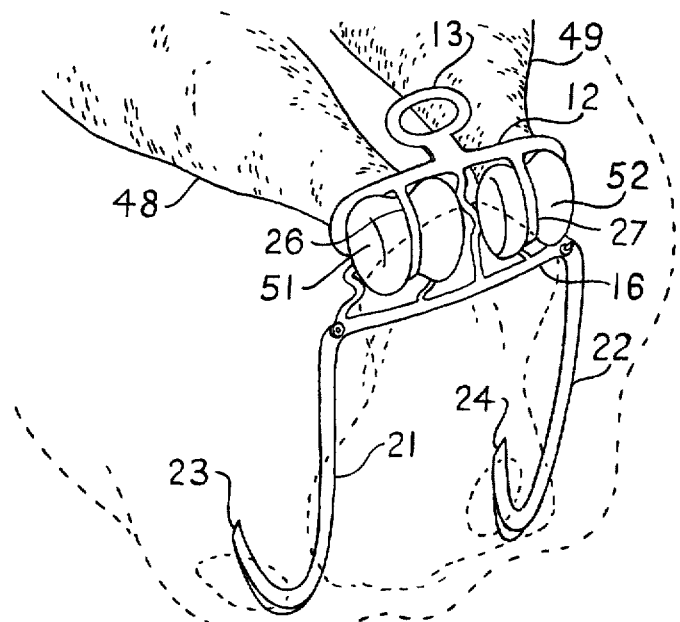
FIG. 5 is a perspective illustration of the retainer of the present invention in position for trussing the legs of the fowl and partially illustrating the fowl in dashed lines.
Figure 6:
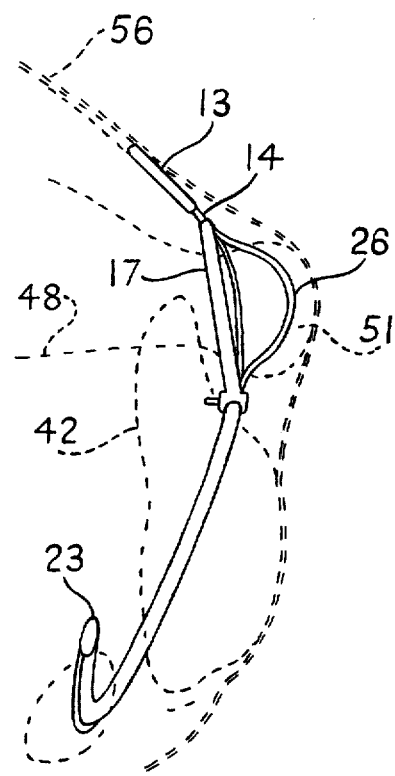
FIG. 6 is a side elevational view of the retainer in the position of FIG. 5 and again partially illustrating a trussed fowl in dashed lines.
Figure 8:
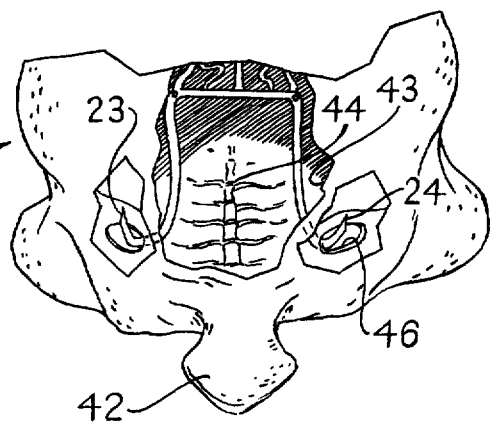
FIG. 8 is a partial rear end view of a fowl such as a turkey with a retainer of the present invention attached to the carcass prior to engagement of the retainer with the legs of the fowl.

The manner in which the present invention is applied to a fowl such as a turkey for trussing of same may be best understood by reference to FIGS. 5, 6 and 8.

Considering now the application of the present invention to a fowl such as a turkey, it is noted first that the tail 42 of the turkey originally extends outwardly from the rear body opening 43 through which the inside of the body has been cleaned. The shanks 21 and 22 of the retainer 11 are initially resiliently pressed together and inserted in the body opening 43 with hooks 23 and 24 then being extended through openings in the side portions of the backbone 44 generally denominated as kidney sockets 46. Release of the laterally inward pressure on the shanks 21 and 22 then allows them to spring outwardly so that the hooks 23 and 24 engage firmly under the bone at the edge of the sockets 46, as illustrated in FIG. 8. The legs 48 and 49 of the fowl are then drawn together at the rear of the body with the hocks or knuckles 51 and 52 of the ankles disposed in side-by-side relation, as illustrated in FIG. 5. With the tail 42 folded upwardly over the rear body opening 43, the retainer is then slipped upon the hocks of the fowl. This may be readily accomplished by placing the retainer bar 16 beneath the hocks and then raising the upper part 12 over the top of the hocks by gripping the ring 13 and pulling the retainer over the hocks. This will slip the side pieces 17 and 18 about the outer sides of the two hocks while drawing the locking members 26 and 27 across the depressions in the hocks. The central member 29 extends between the hocks. In this inserted position the retainer firmly locks the legs of the turkey together against the body and at the same time holds the tail in closing relation to the body opening. The retainer bar 16 bears against the tail to firmly hold the tail against the body over the body opening.

It will be appreciated that, inasmuch as the side members 17 and 18 include convolutions, it is possible for same to be resiliently extended in length. Similarly the curved portions of the locking means and central member allows these elements to be resiliently extended in length and yet all of these elements resiliently attempt to return to original configuration. Thus the retainer of the present invention is adapted to lock or truss the legs of fowl of quite different size. Considering turkeys, for example, it is noted that there are marketed turkeys varying in weight from less than 10 pounds to 30 pounds or more. These turkeys have quite different physical sizes and in the past it has been necessary to provide a substantial number of different sized trussing means to accommodate the wide range of physical sizes of fowl to be trussed. The present invention, on the other hand, is capable of accommodating a substantial variation in physical size and yet to firmly engage the hocks of the bird so as to securely truss the fowl. Although the hocks themselves bear against the tail when the latter is folded over the body opening, the present invention provides a further insurance against possible slippage of the tail from closing relation to this opening. The retainer bar 16 extending beneath the hocks presses against the tail in position so that there is no possibility of the tail slipping out of closing relationship to the opening. This is particularly important inasmuch as portions of the turkey such as the neck and the like, are commonly placed within the body opening prior to trussing the turkey for shipment, storage and sale. Secure closure of the body opening ensures retention of these parts without the possibility of loss or misplacement thereof during shipping or handling.

It has been noted above that the present invention is formed of a limitedly flexible material such as nylon or the like. By the utilization of such a material, it is possible to form certain portions thereof such as the side elements 17 and 18 in such a manner that they may be extended to encompass hocks of varying sizes and yet to exert a full retentive force thereon. Additionally certain portions of the present invention may be formed of a lesser thickness in order to increase the flexibility thereof. The tab 14 connecting the ring 13 and upper bar 12 of the retainer is, in fact, formed of a reduced cross section as shown in FIG. 6, for example, so that the ring 13 may be readily bent back against the body of the fowl after the retainer has been inserted and is attached to the fowl. This is highly advantageous in placing the ring out of the way of a plastic bag or cover 56 that may be employed to envelope the fowl. Frozen fowl are widely employed in commerce and it is conventional for frozen turkeys, chickens and the like to be encased in a clear plastic bag. Any type of rigid protuberance from the body of the fowl might pierce such a bag or at least would form a bump thereon that would be susceptible to damage. With the ring 13 folded flat against the body, as illustrated in FIG. 6, the envelope 56 may be readily tightened about the fowl.

Figure 9:
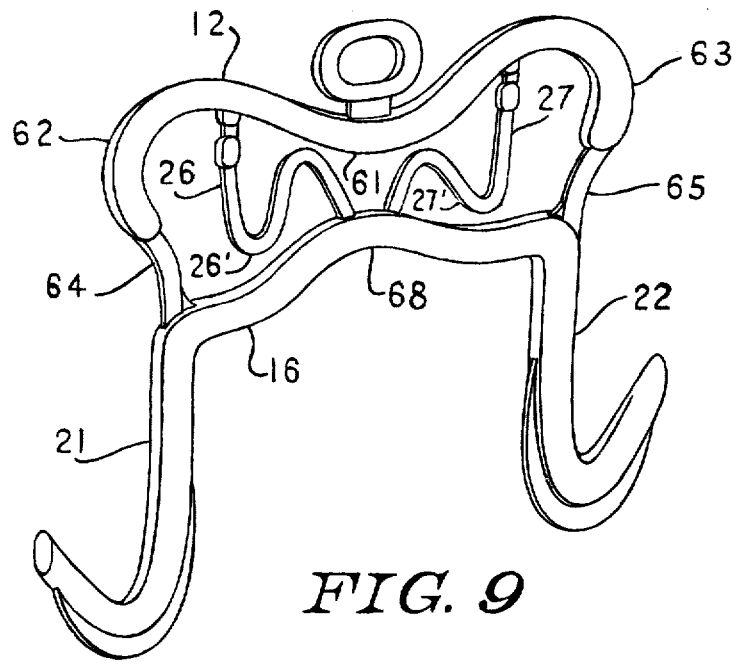
FIG. 9 is a perspective illustration of an alternative embodiment of a retainer in accordance with the present invention.
Figure 10:
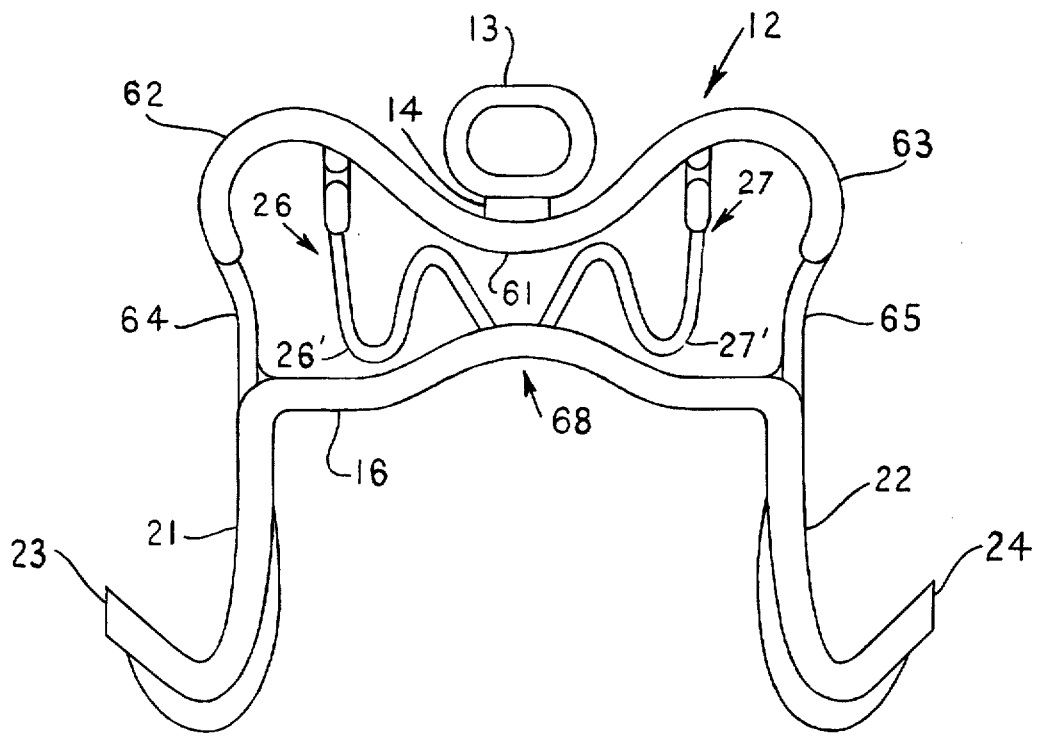
FIG. 10 is a plan view of the retainer of FIG. 9.

The present invention, as described above, may be modified while yet maintaining the essential characteristics thereof. In this respect reference is made to FIGS. 9 and 10 illustrating an alternative embodiment of the present invention wherein the same numbers are employed as in FIG. 1 for elements having like or similar functions. It will first be noted that the upper bar 12 has a downwardly curving center portion 61 and the outer extremities thereof are formed as downwardly and inwardly curved portions 62 and 63. The bar 12, as viewed in plan, has the configuration of a central concave portion and outer convexly curved portions with the extremities of the outer portions 62 and 63 extending downwardly and being connected by slightly curved side members 64 and 65, respectively, to the ends of the lower retaining bar 16. In this embodiment the upper and lower bars 12 and 16 are formed of a substantial thickness while the side members 64 and 65 are formed of reduced cross section so as to more readily flexible.

The lower retainer bar 16 of this embodiment is formed with an upwardly curved center portion 68 aligned with the center portion 61 of the upper bar 12 so that the two bars are closely spaced at the centers thereof. The lower bar and shanks 21 and 22 depending from the ends thereof have a sufficient cross section so as to be only limitedly flexible. The locking members 26 and 27 are similar to those of the embodiments of FIG. 1; however, the lower flexible portions 26' and 27' thereof each extends in somewhat S curves into engagement with the central portion 68 of the retainer bar 16 near the center of this bar. In this embodiment it is not necessary to provide a central connector between the upper and lower bars 12 and 16 inasmuch as the curvature of the centers of these bars toward each other and the increased cross sectional dimensions of the bars provide adequate resistance to undue separation of the bars in use of the device.

The ring 13 is connected by a tab or hinge element 14 or reduced cross section to the center portion 61 of the upper bar 12. In this embodiment it will be seen that the ring fits primarily within this center depression of the upper bar and again the tab connection 14 provides for pivoting of the ring so that it may be pressed back against the fowl and out of the way during packaging thereof. The locking means 26 and 27 operate in the same manner as described above in connection with FIG. 1 and are adapted to fit across the knuckle creases of the fowl in much the same manner as illustrated in FIG. 5. These locking members are resiliently flexible so that they can be snapped over the hocks to firmly lock the device in trussing engagement to the legs of the fowl. It is also to be appreciated that the structure of the upper bar and side members is such that the sides of the device may be resiliently sprung outwardly to fit over larger hocks. This embodiment of the present invention is also adapted to the trussing of fowl of widely varying sizes and the limitedly flexible nature of all portions hereof, together with the provision of curved sections, are particularly advantageous in this respect.

It is further noted with regard to the material and construction of the present invention that same is readily provided in different colors. It is only necessary to incorporate a dye in the plastic material from which the retainers hereof are formed in order to produce retainers of different colors. Such coloring may be employed by the packer to identify different batches or different sources of fowl and this is highly advantageous in the processing of fowl. It is also noted that, by the provision of a ring or the like upon the retainer, it is possible for a cook or chef to readily remove the retainer after the fowl has been cooked. The material of the retainer hereof is impervious to heat, at least within the range of cooking of fowl, and thus the retainer is maintained in position during cooking. The retainer may be readily slipped from the hocks by the housewife or cook in order to gain access to the interior of the fowl for stuffing or removal of parts therein. The limited flexible nature of the retainer and the ring or the like thereon makes it quite simple for the housewife or cook to replace the retainer over the hocks after stuffing of the bird and thus also to lock the stuffing within the bird by retaining the tail in closing relation to the body opening.

The poultry trussing retainer of the present invention is highly advantageous from the viewpoint of the processor and also from the viewpoint of the housewife or the like cooking the fowl trussed with this retainer. The retainer may be readily unhooked from the hocks of the fowl by a housewife or the like while the hooks of the retainer maintain the retainer in engagement of the fowl. The retainer is readily pivoted out of the way when released from the hocks so that the interior of the fowl is available for further cleaning, stuffing or whatever and yet with the tail returned into closing relation to the rear body opening of the fowl, replacement of the retainer upon the hocks securely closes the rear body opening of the fowl to prevent escape of the stuffing that may be placed in the body. No particular dexterity or substantial manual physical exertion is required to replace the retainer on the hocks of the fowl so as to secure the hocks together and to thus completely truss the legs of the fowl and the rear end of the body thereof.

The retainer may be relatively easily removed from the hocks by merely gripping the ring 13 and lifting the retainer from the hocks; however, it is always possible that the fowl may be overdone or that the housewife does not wish to grasp either the retainer of the hocks and, in that circumstance, cutting the retainer from the hocks may be employed. It is recognized that immediately after cooking the portions of the fowl about the retainer are very hot and thus it may be felt to be more convenient by some housewives and the like merely to cut away the retainer with a pair of scissors or sharp knife. This may be readily accomplished by cutting the portions extending between the upper bar 12 and retainer bar 16. This entirely releases the retainer from the hocks so that the upper portion of the retainer may be removed, the hocks separated and the rear body opening of the fowl opened.

The present invention has been described with respect to a single preferred embodiment thereof; however, it will be appreciated by those skilled in the art that modifications and variations are possible within the scope of the present invention. It is thus not intended to limit the present invention to the precise terms of description nor details of illustration.

What is claimed is:

1. A limitedly flexible dressed poultry trussing retainer comprising spaced upper and lower bars having the ends thereof connected by end connections and a pair of spaced locking means extending between the bars intermediate the ends thereof for extension along the creases of the hocks of fowl with the bars disposed above and below the legs of the fowl adjacent the hocks, and a pair of hooks with each hook connected by a shank to a respective end of said lower bar for extension into the carcass of a fowl for engagement with bone structure thereof to truss the fowl.

2. The retainer of claim 1 further defined by said end connections comprising integral portions of said bars extending between the ends of said upper and lower bars for connecting together the bars and said integral portions being formed of limitedly flexible material with curvatures therein to provide limited resilient extension of said portions to increase bar separation.

3. The retainer of claim 1 further defined by a resiliently extensible retainer extending centrally between said bars and formed integrally therewith.

4. The retainer of claim 1 further defined by gripping means flexibly attached to the upper one of said bars in extension away from said hooks for gripping of the retainer by a user.

5. The retainer of claim 1 further defined by said bars and end connections being integral with said locking means and hooks and all being formed of a limitedly flexible and resilient material.

6. The trussing retainer of claim 1 further defined by said upper and lower bars having the centers thereof curved toward each other to strengthen said bars against central movement away from each other in trussing.

7. The trussing retainer of claim 1 further defined by at least one small projection from a first face thereof and a mating small depression aligned therewith on the opposite face whereby trussing retainers may be attached to each other in facing relation by mating projections with depressions.

8. A dressed poultry trussing retainer comprising a unitary element formed of a chemically impervious and limitedly flexible material including
  a pair of spaced upper and lower bars with end portions connecting the bars and such end portions having curved configurations for resilient extension,
  a pair of locking means extending between said bars intermediate the ends thereof and each including curved portions for resilient extension of the locking means to fit in creases at the ends of hocks disposed between said bars, and
  hook means depending from said lower bar ends for engagement with the carcass of poultry.

9. The trussing retainer of claim 8 further defined by said material being nylon and said end portions having a smaller cross section than said bars.

10. The trussing retainer of claim 8 further defined by said upper bar having an upwardly concave center portion joining outwardly convex portions curving downwardly and inwardly with said end portions curving downwardly therefrom into the ends of said lower bar.

11. The trussing retainer of claim 10 further defined by said locking means each extending from said upper bar at the outer ends of the concave center portion into said lower bar adjacent the center thereof.

12. The poultry trussing retainer of claim 10 further defined by a ring connected by a flexible tab to said upper bar at the concave center portion thereof.

* * * * *